US005802327A

United States Patent [19]

Hawley et al.

[11] Patent Number: 5,802,327

[45] Date of Patent: Sep. 1, 1998

[54] DEVICE FOR SCSI EXPANSION

[75] Inventors: Brian N. Hawley; Michael C. Saunders, both of Riverside; Arthur R. Tolsma, Redlands, all of Calif.

[73] Assignee: Luminex Software Incorporated, Riverside, Calif.

[21] Appl. No.: 558,961

[22] Filed: Nov. 13, 1995

[51] Int. Cl.[6] .......... G06F 1/00

[52] U.S. Cl. .......... 395/281; 395/822; 395/823; 395/308

[58] Field of Search .......... 395/281, 842, 395/306, 308, 822, 823

[56] References Cited

U.S. PATENT DOCUMENTS

| | | | |
|---|---|---|---|
| 5,202,979 | 4/1993 | Hillis et al. | 395/575 |
| 5,239,632 | 8/1993 | Larner | 395/325 |
| 5,274,783 | 12/1993 | House et al. | 395/325 |
| 5,564,026 | 10/1996 | Amini et al. | 395/308 |

OTHER PUBLICATIONS

Company Introduction of Intaglio, Intaglio, 5 pps., (Feb. 1995).

CDM-4000 Quad-Speed CD Mastering System Data Specification, Dynatek Structured For Storage, 2 pps., (Nov. 1994).

CD Studio Specification Document, Young Minds, Inc., 4 pps., (1994).

*Primary Examiner*—Jack B. Harvey
*Assistant Examiner*—Jigar Pancholi
*Attorney, Agent, or Firm*—Blakely Sokoloff Taylor & Zafman

[57] ABSTRACT

A SCSI expansion device receives a first SCSI identifier and logical unit number from a first SCSI bus for identifying a first SCSI peripheral. The SCSI expansion device converts the first SCSI identifier and logical unit number to a second SCSI identifier and logical unit number and represents the first SCSI peripheral to external devices coupled to a second SCSI bus with the second SCSI identifier and logical unit number.

15 Claims, 11 Drawing Sheets

DEVICE FOR SCSI EXPANSION

FIELD OF THE INVENTION

The present invention relates to Small Computer System Interface (SCSI) connectors. More specifically, the present invention relates to a device for increasing the number of SCSI peripherals that can be connected to a computer system.

BACKGROUND OF THE INVENTION

SCSI is an 8-bit parallel cable interface with handshakes and protocols for handling multiple hosts and multiple peripherals. It has both asynchronous and synchronous modes, and defined software protocols. SCSI interface cards serve as host adapters and typically plug into a microcomputer bus on a computer system. The host adapter may then be connected to a peripheral's controller card via a flat-cable SCSI bus or directly to a peripheral having an embedded-SCSI architecture in which the SCSI bus becomes also the device-level interface.

The popularity of SCSI has increased dramatically in recent years. SCSI has the advantage of effectively making all microcomputers compatible with all peripherals. SCSI supports data rates up to 1.5 Mbytes (asynchronous) or 4 Mbytes (synchronous), with cable lengths to 20 feet (single-ended) or 80 feet (differential). It is not uncommon for a computer system to support a large number of SCSI peripherals. CD ROM drive tower devices for example, typically attach up to 21 SCSI drives to the host.

The number of SCSI peripherals that can be interfaced with a computer system depends on the number of available host adapters on the computer system. For DOS and Windows based system, there is limited address space for additional host adapters. For UNIX based systems, there amount of physical space limits the number of host adapters that can be implemented in the system. Adding additional host adapters to a computer system also translates to increased cost to the overall system.

Thus, what is needed is a device for maximizing the number of SCSI peripherals that can be connected to host adapters in a computer system.

SUMMARY OF THE INVENTION

A device for SCSI expansion is described. The device comprises a first SCSI bus for coupling to a first SCSI device. The device further comprises a second SCSI bus for coupling to a host adapter. A converter is coupled to the first SCSI bus and the second SCSI bus. The converter is operable to receive a first SCSI identifier and a logical unit number over the first SCSI bus. The converter is also operable to convert the first SCSI identifier and logical unit number to a second SCSI identifier and logical unit number. A direct memory access controller is coupled to the first SCSI bus and the second SCSI bus for coordinating data transfer between an external device coupled to the second SCSI bus and the first SCSI device.

A method according to a second embodiment of the present invention is also described. The method comprises the following steps. First, a first address with a first SCSI identifier and logical unit number is transmitted along a first SCSI bus. Next, the first address is converted to a second address with a second SCSI identifier and logical unit number. The second address corresponds to the first device on a first SCSI bus. Next, the second address is transferred along a second SCSI bus.

BRIEF DESCRIPTION OF THE DRAWINGS

The present invention will be understood more fully from the detailed description given below and the accompanied drawings of the various features and elements embodied in the invention. The description and drawings are not meant to limit the invention to the specific embodiment. They are provided for explanation and understanding.

DETAILED DESCRIPTION

A novel expansion apparatus is described. In the following detailed description numerous specific details are set forth in order to provide a thorough understanding of the present invention. However, it will be understood by those skilled in the art that the present invention may be practiced without these specific details. In other instances well known methods, procedures, components, and circuits have not been described in detail so as not to obscure the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
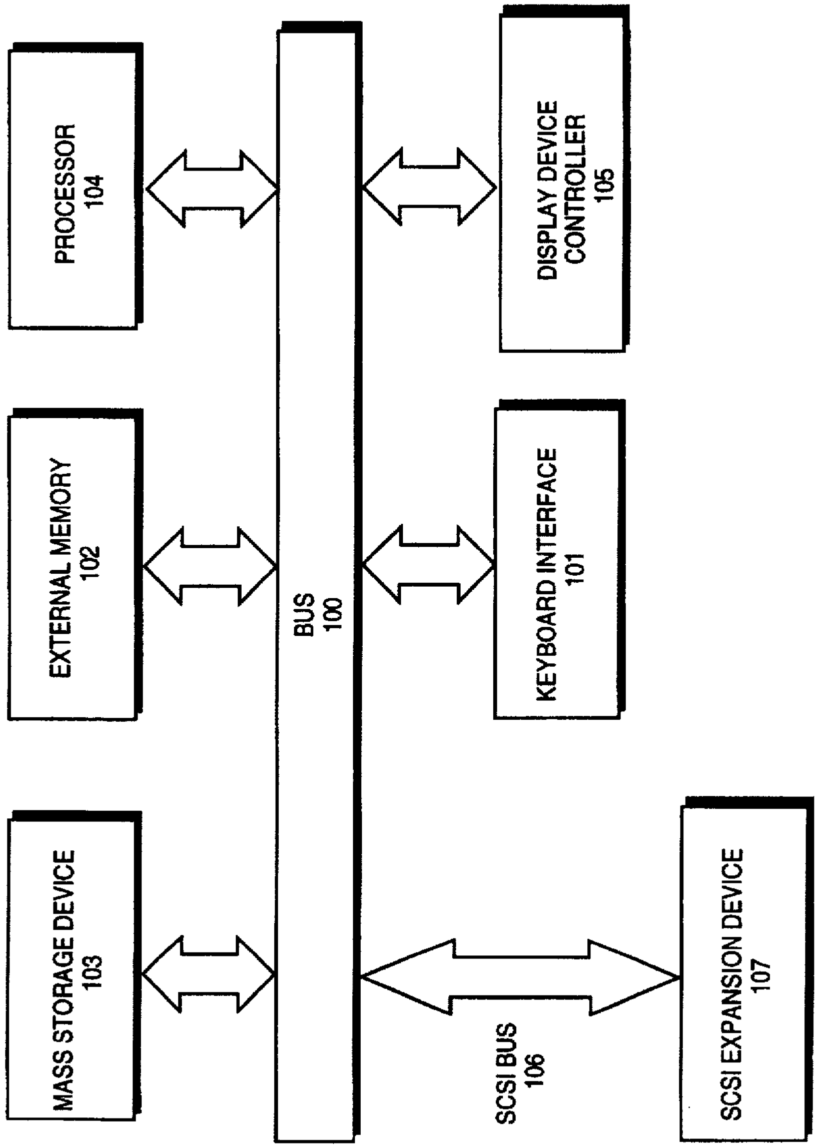
FIG. 1 illustrates an embodiment of the present invention as implemented in a computer system.

FIG. 1 illustrates an embodiment of the present invention as implemented in a computer system. The computer system comprises bus 100, keyboard interface 101, external memory 102, mass storage device 103, processor 104 and display device controller 105. Bus 100 is coupled to display device controller 105, keyboard interface 101, microprocessor 104, memory 102 and mass storage device 103. Display device controller 105 can be coupled to a display device. Keyboard interface 101 can be coupled to a keyboard.

Bus 100 can be a single bus or a combination of multiple buses. As an example, bus 100 can comprise an Industry Standard Architectural (ISA) bus, an Extended Industry Standard Architecture (EISA) bus, a system bus, a X-bus, PS/2 bus, a Peripheral Components Interconnect (PCI) bus, a Personal Computer Memory Card International Association (PCMCIA) bus or other buses. Bus 100 can also comprise a combination of any buses. Bus 100 provides communication links between components in the computer system. Keyboard interface 101 can be a keyboard controller or other keyboard interface. Keyboard interface 101 can be a dedicated device or can reside in another device such as a bus controller or other controller. Keyboard interface 101 allows coupling of a keyboard to the computer system and transmits signals from a keyboard to the computer system. External memory 102 can comprise a dynamic random access memory (DRAM) device, a static random access memory (SRAM) device, or other memory devices. External memory 102 stores information and data from mass storage device 103 and processor 104 for use by processor 104. Mass storage device 103 can be a hard disk drive, a floppy disk drive, a CD-ROM device, a flash memory device or other mass storage device. Mass storage device 103 provides information and data to external memory 102.

Processor 104 processes information and data from external memory 102 and stores information and data into external memory 102. Processor 104 also receives signals from keyboard controller 101 and transmits information and data to display device controller 105 for display on a display device. Processor 104 also transmits video images to display controller for display on a display device. Processor 104 can be a complex instruction set computing (CISC) microprocessor, a reduced instruction set computing (RISC) microprocessor, a very long instruction word (VLIW) microprocessor or other processor device. Display device controller 105 allows coupling of a display device to the computer system and acts as an interface between the display device and the computer system. Display device controller 105 can be a monochrome display adapter (MDA) card, a color graphics adapter (CGA) card, enhanced graphics adapter (EGA) card, multi-color graphics array (MCGA) card, video graphics array (VGA) card, extended graphics array (XGA) card or other display device controller. The display device can be a television set, a computer monitor, a flat panel display or other display device. The display device receives information and data from processor 104 through display device controller 105 and displays the information and data to the user of the computer system.

The computer system also comprises SCSI expansion device 107. SCSI expansion device is coupled to an external SCSI bus 106. External SCSI bus 106 may be a flat cable SCSI bus or any other type of SCSI bus. External SCSI bus 106 is coupled to a host adapter on bus 100. SCSI expansion device 107 comprises a first SCSI bus for coupling to a first SCSI peripheral and a second SCSI bus for coupling to external SCSI bus 106. SCSI expansion device 107 also comprises a converter coupled to the first SCSI bus and the second SCSI bus. The converter is operable to receive a first SCSI identifier (ID) and logical unit number (LUN) over the first SCSI bus.

A typical host adapter supports a plurality of SCSI IDs. Each SCSI ID, in turn, typically supports a plurality of LUNs. SCSI IDs and LUNs are used as addresses by the computer system to identify a specific SCSI device. During initialization of the computer system, each SCSI peripheral is given a SCSI ID and LUN according to the location of its interface. The SCSI ID and LUN of the peripheral is then used by the computer system to determine where to transfer data.

The converter in SCSI expansion device 107 is also operable to convert the first SCSI ID and the first LUN to a second SCSI ID and a second LUN. SCSI expansion device 107 also comprises a direct memory access controller coupled to the first SCSI bus 106 and the second SCSI bus.

Figure 2:
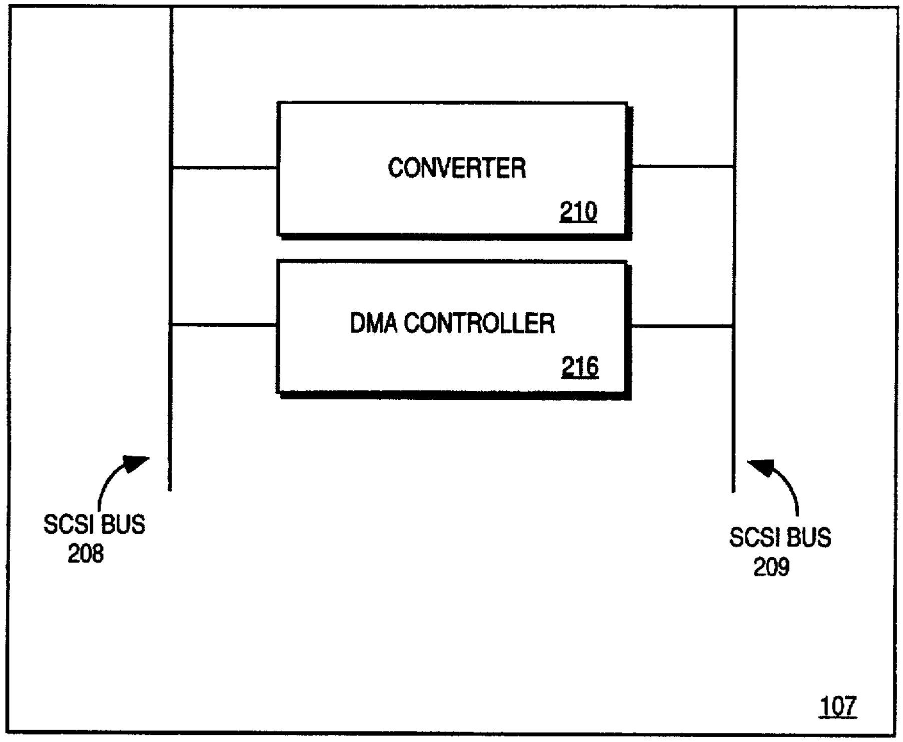
FIG. 2 illustrates a block diagram of one embodiment of the SCSI expansion device for performing LUN mapping.

FIG. 2 illustrates a block diagram of one embodiment of SCSI expansion device 107. SCSI expansion device 107 comprises SCSI bus 208 and SCSI bus 209. SCSI expansion device 107 also comprises converter 210 and direct memory access controller 216. Converter 210 is coupled to first SCSI bus 208 and second SCSI bus 209. First SCSI bus 208 can be coupled to a SCSI device. Second SCSI bus 209 can be coupled to an external SCSI bus such as SCSI bus 106. Converter 210 can be an Application Specific Integrated Circuit (ASIC) or other circuitry or device. Converter 210 may be implemented through circuitry, software, or a combination of circuitry and software.

Converter 210 is operable to receive a first SCSI ID and LUN over the first SCSI bus 208 from a first SCSI peripheral. Converter 210 operates to convert the first SCSI ID and LUN of the first SCSI peripheral to a second SCSI ID and LUN. Converter 210 represents the first SCSI peripheral with the second SCSI ID and LUN to a computer system coupled to second SCSI bus 209 by sending the second SCSI ID and LUN on second SCSI bus 209. The first SCSI peripheral thus appears to the computer system as having the second SCSI ID and LUN. When the computer system wishes to communicate with the first SCSI peripheral, it addresses the first SCSI peripheral with the second SCSI ID and LUN. Similarly, converter 210 is operable to receive the second SCSI ID and LUN over the second SCSI bus 209. When it receives the second SCSI ID and LUN it converts the second SCSI ID and LUN to the first SCSI ID and LUN. As a result, converter 210 effectively maps information from one set of SCSI IDs and LUNs to a second set of SCSI IDs and LUNs.

As an example, SCSI expansion device 107 is connected to SCSI ID=2 on a first host adapter in a computer system. A first SCSI peripheral is coupled to first SCSI bus 208 on SCSI expansion device 107. During an initialization process, the first SCSI peripheral transmits a signal to the computer system to identify itself and its location. The SCSI peripheral transmits a device identification code along with its address, SCSI ID=3 and LUN=0. Converter 210 receives the address from first SCSI bus 208 and converts the address to a second address SCSI ID=2, LUN=3. This second address is transmitted on second SCSI bus 209 along with the device identification code to the computer system. Similarly, when the computer system transmits the second SCSI ID and LUN address through second SCSI bus 209 to converter 210, converter 210 operates to receive the second SCSI ID and LUN and converts it to the first SCSI ID and LUN.

It will be appreciated that converter 210 allows multiple SCSI peripherals to be coupled to a single SCSI ID by converting a first address on first SCSI bus 208 to a second address. Typically, SCSI peripherals are pre-programmed to recognized addresses which have LUNs designated to 0. This prevents a host adapter from supporting more than one SCSI device on each SCSI ID. The converter 210 of the present invention allows an increased numbers of SCSI peripherals to be coupled to a computer system given a fixed number of host adapters. Using converter 210, a typical host adapter which supports seven SCSI IDs, each supporting seven LUNs, is able to support up to 49 SCSI peripherals.

Converter 210 also regenerates the SCSI signal transmitted on SCSI buses 208 and 209. This allows the distance between the external device or host computer system on SCSI bus 209 and the first SCSI device on SCSI bus 208 to be increased. Thus, in environments where standard SCSI cable length is not feasible, converter 210 can be used to expand connectivity and increase the SCSI cabling distances.

DMA controller 216 is coupled to first SCSI bus 208 and second SCSI bus 209. DMA controller 216 can be an ASIC or other circuitry or device. DMA controller 216 can be a single chip or can comprise a plurality of chips. DMA controller 216 is coupled to SCSI bus 208 and SCSI bus 209. DMA controller 216 allows DMA data transfer between a first SCSI peripheral coupled to first SCSI bus 208 and a computer system coupled to second SCSI bus 209. A DMA file transfer can be accomplished by transmitting a starting address from the computer system on SCSI bus 209 for the data transfer, transmitting byte count information for the data transfer and transmitting the data. Likewise, a DMA data transfer can be accomplished in the other direction by transmitting a starting address from the SCSI device on SCSI bus 208, transmitting byte count information for the data transfer and transmitting the data.

In a preferred embodiment of the present invention, DMA controller 211 comprises two DMA controller chips. A first DMA controller chip controls data transferred on SCSI bus 208. A second DMA controller chip controls data transferred on SCSI bus 209. Each of the DMA controller chips comprises a 16 byte FIFO. First DMA controller chip and second DMA controller chip are programmed to transfer data according to three classes of commands which correspond to three different classes of data to be transferred. When the SCSI expansion device 107 receives a command it first determines the associated direction of the data transfer. If the data transfer is from the computer system coupled to SCSI bus 209 to a peripheral device coupled to SCSI bus 208, SCSI expansion device 107 decodes the command to see whether the transfer is a write command or a non-write command. If the command is a write command, the SCSI expansion device 107 programs DMA controller 211 to transfer data at a predetermined block. In a preferred embodiment of the present invention, SCSI expansion device 107 programs DMA controller 211 to transfer data in 512 byte blocks. If the command is a non-write command, such as mode select command, send diagnostic, or vender unique commands, the SCSI expansion device programs the DMA controller 211 to transfer data byte by byte. If, however, the associated direction of the data transfer is from the SCSI expansion device to the computer system, then the expansion device always programs the DMA controller 211 to transfer data in 512 byte blocks.

Figure 3:
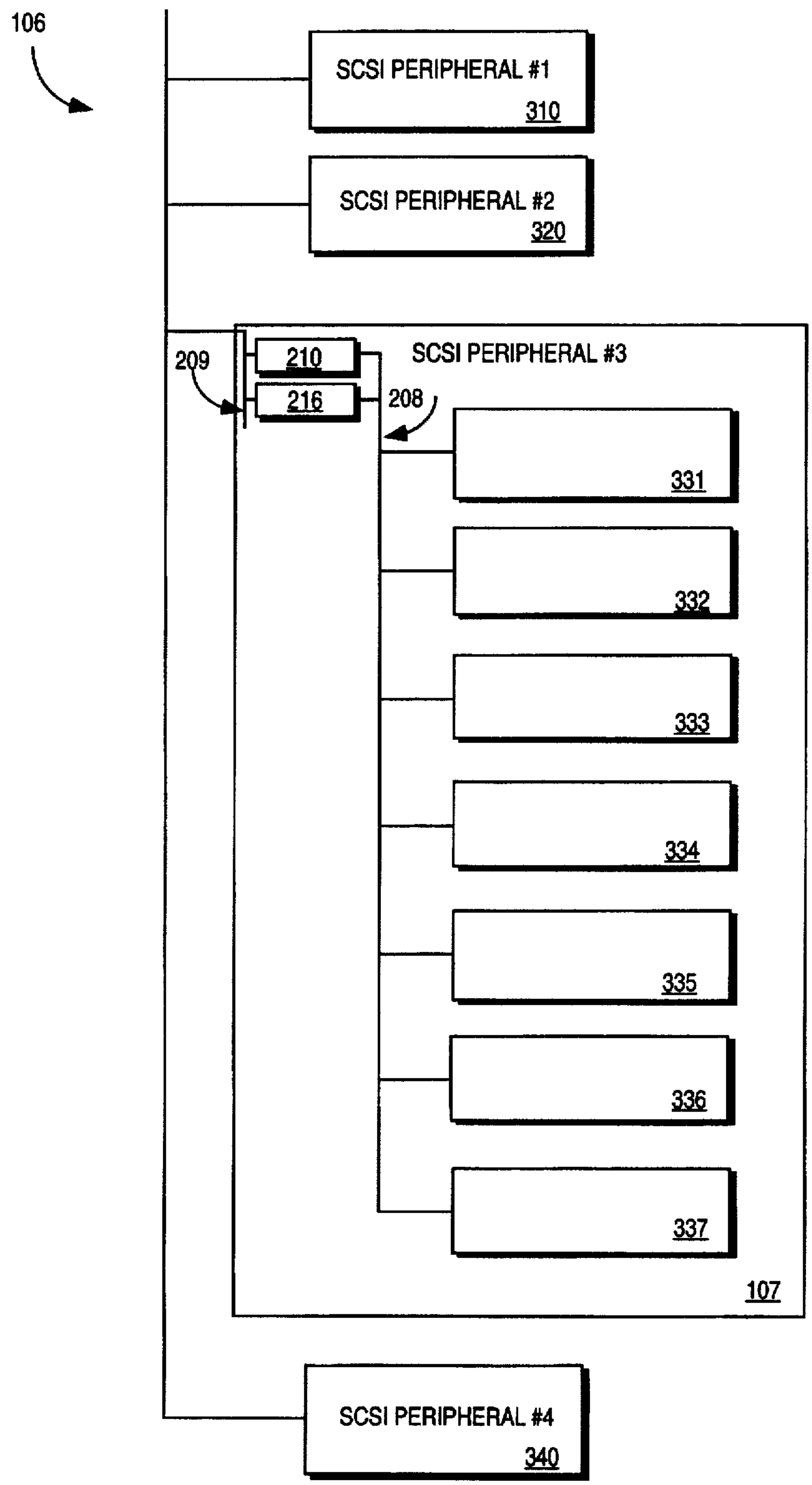
FIG. 3 illustrates a cabling diagram of one embodiment of the SCSI expansion device.

FIG. 3 illustrates a cabling diagram of the present invention as being used for SCSI expansion. SCSI bus 106 is a host SCSI chain which is coupled to a host adapter at one end and to a plurality of SCSI devices at a second end. The plurality of SCSI devices include SCSI device #1 310 having SCSI ID=1, SCSI device #2 320 having SCSI ID=2, SCSI device #3 107 having SCSI ID=3, and SCSI device #4 340 having SCSI ID=4. SCSI device #1 310, SCSI device #2 320, and SCSI device #4 107 can be one of any variety of SCSI devices. For example, SCSI device #1 310, SCSI device #2 320, and SCSI device #4 340 can be a SCSI tape drive, CD player, CD recorder, or disk drive. SCSI device #3 107 is a SCSI expansion device. SCSI expansion device 107 comprises circuitry similar to the SCSI expansion device 107 illustrated in FIG. 2.

SCSI bus 106 is coupled to a second SCSI bus 209 in SCSI expansion device 107. Additional SCSI devices are attached to a first SCSI bus 208 in SCSI expansion device 107. In this embodiment of the present invention, seven SCSI devices can be presented to SCSI bus 106 as a single SCSI ID. The SCSI expansion device performs LUN expansion through a converter 210, enabling up to seven devices to be supported on a single SCSI ID. SCSI devices 331, 332,333, 334,335,336, and 337 are coupled to the second SCSI bus. SCSI devices 331, 332, 333, 334, 335, 336, and 337 are each assigned an associated LUN. The SCSI devices connected to the SCSI expansion device 107 respond to signals from a processor connected to the first end of SCSI bus 106 at the SCSI expansion IN ID and LUN equal to the SCSI ID of the attached device.

Figure 4:
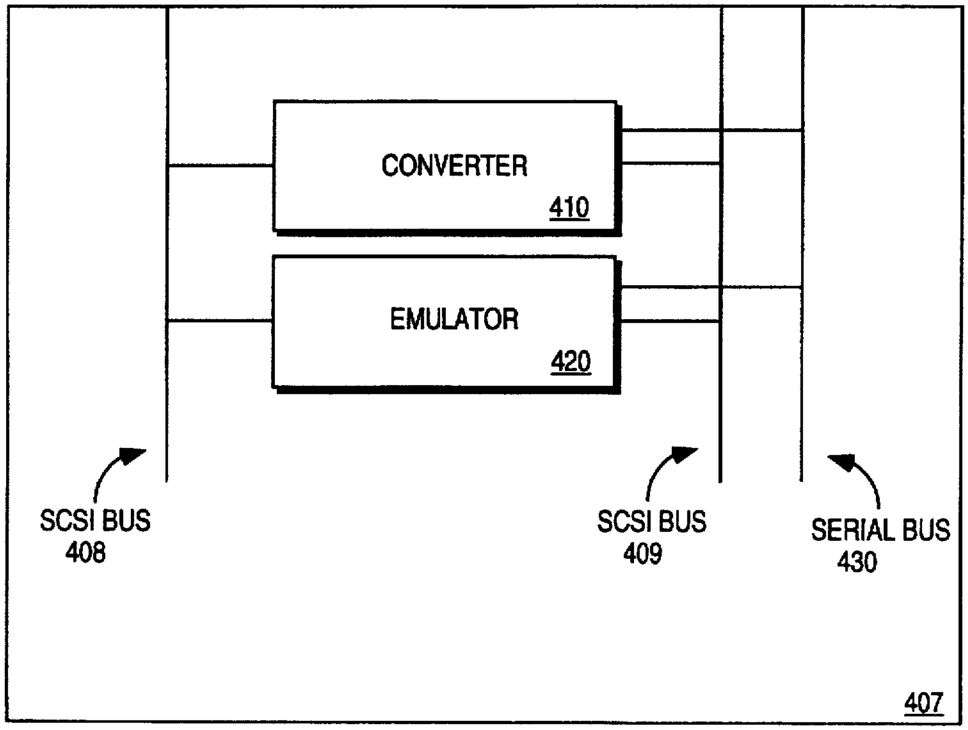
FIG. 4 illustrates a second embodiment of the SCSI expansion device for performing SCSI-serial translation.

FIG. 4 illustrates in block diagram form a SCSI expansion device of a second embodiment of the present invention. SCSI expansion device 407 comprises a first SCSI bus 408, a second SCSI bus 409, and serial bus 430. SCSI expansion device 407 also comprises converter 410, emulator 420. Converter 410 is coupled to SCSI bus 408, SCSI bus 409, and serial bus 430. SCSI bus 409 can be coupled to an external SCSI bus which communicates with a computer system. SCSI bus 408 can be coupled to a first SCSI peripheral and serial bus 430 can be coupled to a first serial peripheral. Converter 410 can be an ASIC or other circuitry or device.

Converter 410 is operable to receive a first SCSI ID and LUN over the first SCSI bus 408 from a first SCSI peripheral and a first serial identifier over the serial bus 430 from the first serial peripheral. Converter 410 is operable to convert the first SCSI ID and LUN of the first SCSI peripheral to a second SCSI ID and LUN. Converter 410 is also operable to convert the first serial identifier to a third SCSI ID and LUN. Converter 410 represents the first SCSI peripheral with the second SCSI ID and LUN to a computer system coupled to SCSI bus 409 by sending the second SCSI ID and LUN on SCSI bus 409. Converter 410 represents the first serial peripheral with the third SCSI ID and LUN to a computer system coupled to SCSI bus 409 by sending the third SCSI ID and LUN on SCSI bus 409. The first SCSI peripheral thus appears to the computer system as having the second SCSI ID and LUN and the first serial peripheral thus appears to the computer system as having the third SCSI ID and LUN. When the computer system wishes to communicate with the first SCSI peripheral, it addresses the first SCSI peripheral with the second SCSI ID and LUN. Similarly, when the computer system wishes to communicate with the first serial peripheral, it addresses the first serial peripheral with the third SCSI ID and LUN. Converter 410 is operable to receive the second SCSI ID and LUN and third SCSI ID and LUN over the second SCSI bus 409. When converter 410 receives the second SCSI ID and LUN it converts the second SCSI ID and LUN to the first SCSI ID and LUN and sends it over first SCSI bus 408. When converter 410 receives the third SCSI ID and LUN it converts the third SCSI ID and LUN to the first serial identifier and sends it over first serial bus 430. As a result, converter 210 effectively maps information from one set of SCSI IDs and LUNs to a second set of SCSI IDs and LUNs.

Emulator 420 is coupled to first SCSI bus 408, second SCSI bus 409, and serial bus 430. Emulator 420 can be an ASIC or other circuitry or device. Emulator 420 may be implemented through circuitry, software, or a combination of circuitry and software. Emulator 420 is operable to emulate a SCSI device. When the serial peripheral transmits a command over serial bus 430 to the computer system coupled to SCSI bus 409, the emulator 420 translates the command to a corresponding command of a SCSI peripheral. Likewise, when the computer system or other external device transmits a SCSI command to the serial peripheral, the emulator 420 translates the SCSI command to a corresponding command of a serial peripheral. In this manner, the serial device appears as a SCSI device to the computer system or other device coupled to SCSI bus 409.

It will be appreciated that the serial bus 430 allows a computer system to communicate with a SCSI device and a serial device through a single SCSI bus. First SCSI peripheral connected to first SCSI bus 408 and first serial peripheral connected to serial bus 430 communicates directly with the computer system through second SCSI bus 409 using SCSI expansion device 407. Expansion device 407 eliminates the requirement of an international standard on how to write a driver to control specific serial devices. Expansion device allows a computer system to communicate with a serial peripheral as if the serial peripheral was a SCSI peripheral. Thus, for example, devices such as certain CD-ROM jukeboxes with SCSI readers and serial robots can be controlled by a computer system through the use of a single SCSI port coupled to a single SCSI bus. SCSI expansion device 407 also allows for devices such as certain CD-ROM jukeboxes to utilize existing software written for SCSI devices even though they have serial robots.

SCSI expansion device 407 can further comprise a DMA controller. The DMA controller would be coupled to first SCSI bus 408, second SCSI bus 409, and serial bus 430. The DMA controller would operate to coordinate DMA data transfers between the computer system coupled to second SCSI bus 409 and SCSI and serial peripherals coupled to first SCSI bus 408 and serial bus 430. DMA controller comprises circuitry similar to that of DMA controller 216 illustrated in FIG. 2.

Figure 5:
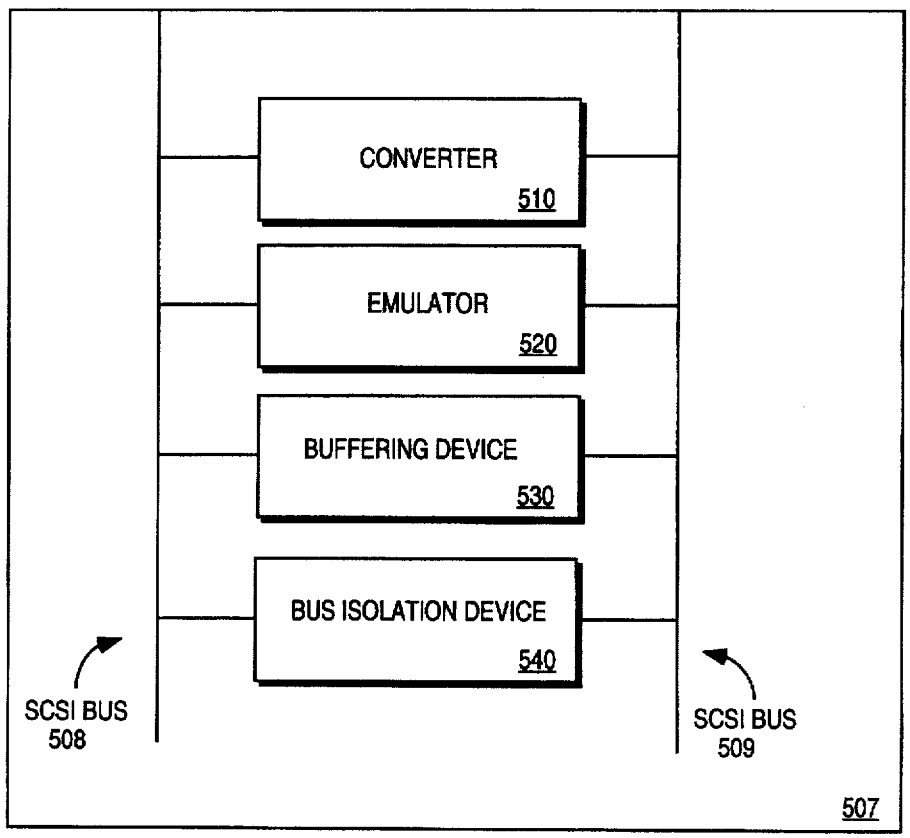
FIG. 5 illustrates a third embodiment of the SCSI expansion device for coordinating the transfer of data at a constant throughput rate.

FIG. 5 illustrates in block diagram form a SCSI expansion device of a third embodiment of the present invention. SCSI expansion device 507 comprises SCSI bus 508 and SCSI bus 509. SCSI expansion device 507 also comprises converter 510, emulator 520, buffering device 530, and bus isolation device 540. Converter 510, emulator 520, buffering device 530, and bus isolation device 540 are coupled to first SCSI bus 508 and second SCSI bus 509. First SCSI bus 508 can be coupled to a first SCSI peripheral and a second SCSI peripheral. Second SCSI bus 509 can be coupled to an external SCSI bus which is connected to an external device such as a computer system. Converter 510, emulator 520, buffering device 530, and bus isolation device 540 can be an ASIC or other circuitry or device. In this embodiment of the present invention, converter 510, emulator 520, buffering device 530, and bus isolation device 540 operate to provide to the first SCSI peripheral data from the computer system at a constant throughput. Second SCSI peripheral can be a number of devices including a disk drive, a tape drive, or any other type of data storage device. First SCSI peripheral can be any SCSI peripheral which utilizes data sent at a constant throughput rate through SCSI bus 508. One example of first SCSI peripheral is a CD recorder.

Emulator 520 operates to emulate the first SCSI peripheral on first SCSI bus 508. Emulator comprises a set of instructions used by the first SCSI peripheral and allows SCSI expansion device 507 to communicate with the external computer system as if it were the first SCSI peripheral. Thus, during a data transfer session when the computer system wishes to transfers data to the first SCSI peripheral, the external computer system will send data to the SCSI expansion device 507 through SCSI bus 509. Converter 510 operates to direct data received from second SCSI bus 509 to the SCSI ID and LUN on SCSI bus 508 which the second SCSI peripheral is coupled to.

Buffering device 530 coordinates the movement of data from the computer system to the second SCSI peripheral. Buffering device 530 buffers data invisibly to the second SCSI peripheral.

After data transfer is completed between the computer system and the second SCSI peripheral, bus isolation device 540 operates to isolate first SCSI bus 508 from second SCSI bus 509. This allows the SCSI expansion device to become a dedicated server for transferring data from the second SCSI peripheral to the first SCSI peripheral at a constant throughput rate without any interruptions. After all the data from the second SCSI peripheral has been transferred to the first SCSI peripheral, bus isolation device 540 restores the connection between SCSI bus 508 and SCSI bus 509.

It will be appreciated that SCSI expansion device 507 allows a CD recorder to produce reliable recording from a network server or other computer systems. CD recorders require a constant and uninterrupted data throughput varying from 150 KBS to 900 KBS. SCSI expansion device 507 reduces the effect of processor interruptions, bus traffic, SCSI bus resets, and hard disk thermal recalibration which prevent a computer system from transferring data at a constant throughput rate. SCSI expansion device 507 allows data to be delivered to the CD recorder by the computer system at any data rate. The SCSI expansion device 507 buffers the data onto a second SCSI peripheral device, such as a hard disk, and at appropriate intervals, sends the data to the recorder at the required throughput when the CD recorder is isolated from the computer system. SCSI expansion device allows reliable CD recordings to be made on a system which is not specifically dedicated to the recording process.

SCSI expansion device 507 allows the computer system to transfer data in a format independent of the SCSI expansion device. SCSI expansion device 507 allows the computer system to be free from the limitations and constraint of any predefined formatting structure that proprietary software may impose.

SCSI expansion device 507 can further comprise a serial bus. Converter 510, emulator 520, buffering device 530, and bus isolation device 540 would be coupled to the serial bus. A first serial peripheral and a second serial peripheral can be coupled to the first serial bus and SCSI expansion device 507 can operate to provide the second serial peripheral data from the computer system at a constant throughput. First serial device can be a CD) recording device and second serial device can be a storage device. SCSI expansion device 507 could operate to allow a serial CD recorder to produce reliable recording from a network server or other computer systems.

SCSI expansion device 507 can further comprise a DMA controller. The DMA controller would be coupled to first SCSI bus 508 and second SCSI bus 509. The DMA controller would operate to coordinate DMA data transfers between the computer system coupled to first SCSI bus 408 and SCSI peripherals coupled to second SCSI bus 509. DMA controller comprises circuitry similar to that of DMA controller 216 illustrated in FIG. 2.

Figure 6:
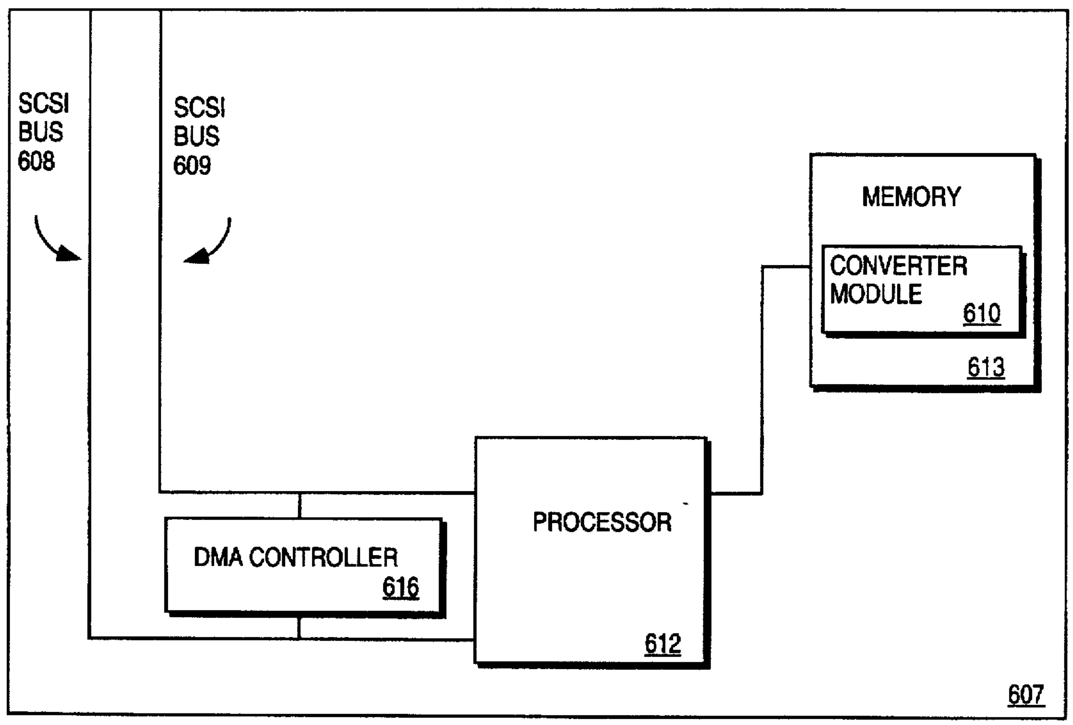
FIG. 6 illustrates a forth embodiment of the SCSI expansion device for performing LUN mapping.

FIG. 6 illustrates a SCSI expansion device of a forth embodiment of the present invention in block diagram form. SCSI expansion device 607 comprises first SCSI bus 608, second SCSI bus 609, processor 612, memory 613 and DMA controller 616. Processor 612 is coupled to SCSI bus 608 and SCSI bus 609. Memory 613 is coupled to processor 612. Processor 612 can be a CISC microprocessor, a RISC microprocessor, a VLIW microprocessor or other processor device. Memory 613 can be a DRAM device, a SRAM device, a flash RAM device or other memory device. Memory 613 stores a plurality of processor executable instructions. Memory 613 can also receive processor executable instructions through SCSI bus 609 from a computer system coupled to SCSI bus 609. Memory 613 can also receive processor executable instructions through SCSI bus 608. In addition to memory 613, SCSI expansion device 607 can also comprises a second memory device. The second memory device can be a programmable read only memory (PROM), erasable programmable read only memory (EPROM), electrically erasable programmable read only memory (EEPROM) or other memory device. The second memory device can be programmed by receiving instructions from SCSI bus 708 or SCSI bus 709. The second memory device can be used to store boot up instructions for use by processor 612.

DMA controller 616 operates to coordinate DMA data transfers between the external computer system coupled to second SCSI bus 609 and SCSI peripherals coupled to first SCSI bus 608. DMA controller 616 comprises circuitry similar to that of DMA controller 216 illustrated in FIG. 2. In this embodiment of the present invention, DMA controller 616 comprises two controllers. A first DMA controller coordinates data transfers on SCSI bus 608 and a second controller coordinates data transfers on SCSI bus 609.

Memory 613 comprises converter module 610. Converter module 610 comprises a first plurality of processor executable instructions which is executable by processor 612 in the manner shown in FIG. 9. Converter module 610 performs functions similar to that of converter 210 in FIG. 2.

Figure 7:
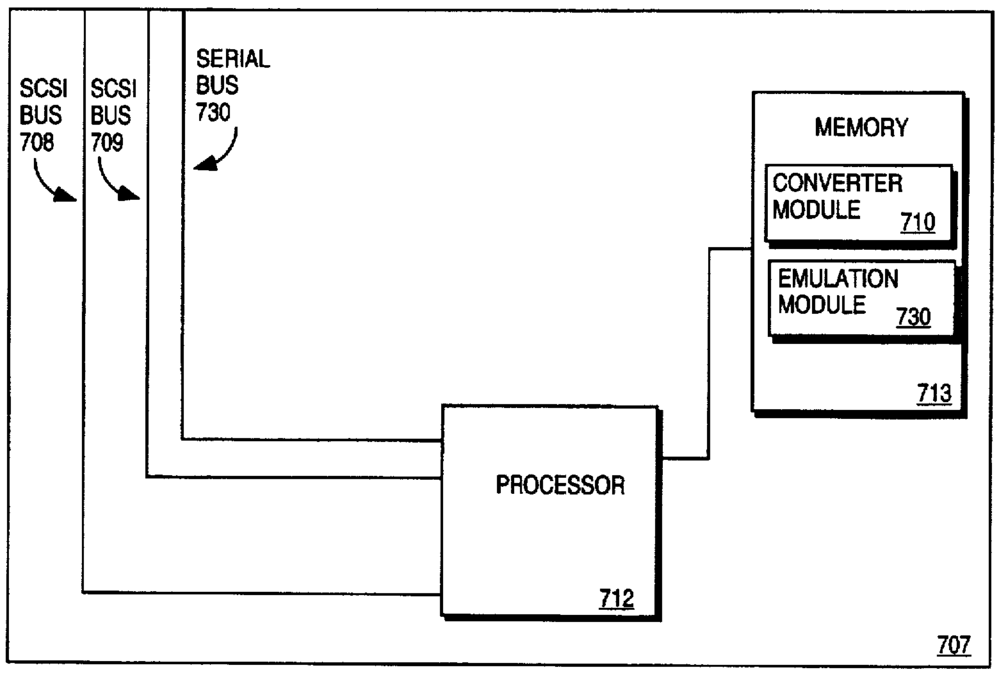
FIG. 7 illustrates a fifth embodiment of the SCSI expansion device for performing SCSI-serial translation.

FIG. 7 illustrates a fifth embodiment of the present invention in block diagram form. SCSI expansion device 707 comprises first SCSI bus 708, second SCSI bus 709, serial bus 730, processor 712, and memory 713. Processor 712 is coupled to first SCSI bus 708, second SCSI bus 709, and serial bus 730. Memory 713 is coupled to processor 712. Processor 712 is similar to that of processor 612 described in FIG. 6. Memory 713 is similar to that of memory 613 described in FIG. 6. In addition to memory 713, SCSI expansion device 707 can also comprises a second memory device. The second memory device can be a programmable read only memory (PROM), erasable programmable read only memory (EPROM), electrically erasable programmable read only memory (EEPROM) or other memory device. The second memory can be programmed by receiving instructions from SCSI bus 708 or SCSI bus 709 or from the serial bus 730. The second memory device can be used to store boot up instructions for use by processor 712.

Memory 713 comprises converter module 710 and emulation module 720. Converter module 710 comprises a first plurality of processor executable instructions which is executable by processor 712 in the manner shown in FIG. 10. Converter module 710 performs functions similar to that of converter 410 in FIG. 4. Emulation module 720 comprises a second plurality of processor executable instructions which is executed by processor 712 in the manner shown in FIG. 10. Emulation module 720 performs functions similar to that of emulator 420 in FIG. 4.

Figure 8:
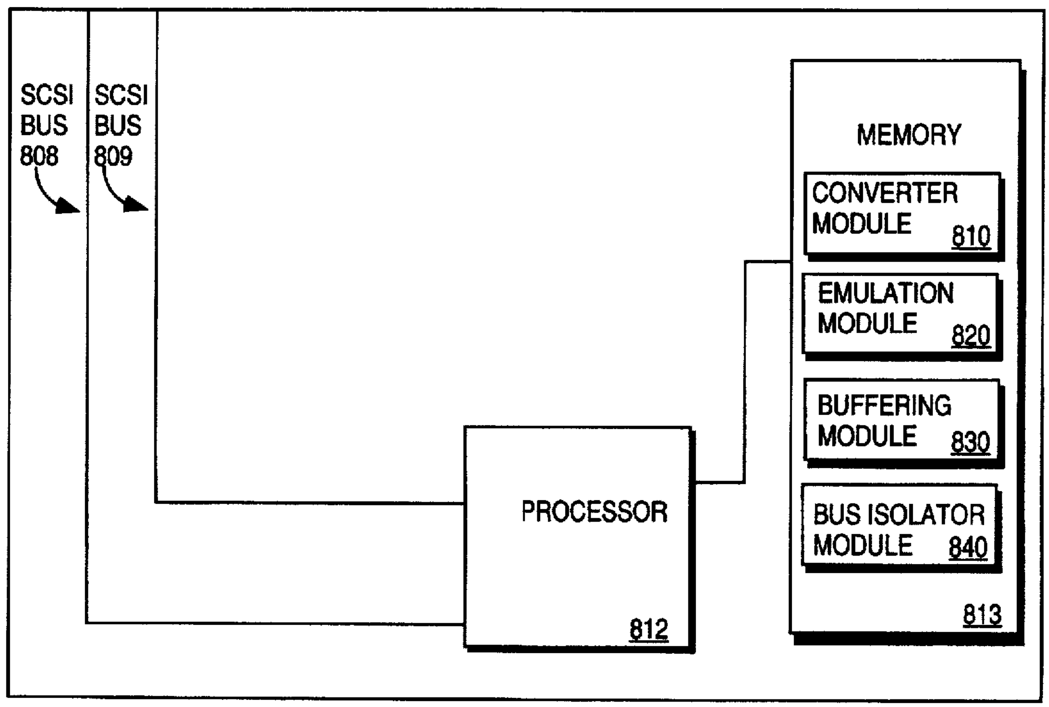
FIG. 8 illustrates an sixth embodiment of the SCSI expansion device for coordinating the transfer of data at a constant throughput rate.

FIG. 8 illustrates an sixth embodiment of the present invention in block diagram form. SCSI expansion device 807 comprises first SCSI bus 808, second SCSI bus 809, processor 812, and memory 813. Processor 812 is coupled to first SCSI bus 808 and second SCSI bus 809. Memory 813 is coupled to processor 812. Processor 812 is similar to that of processor 612 described in FIG. 6. Memory 813 is similar to that of memory 813 described in FIG. 6. In addition to memory 813, SCSI expansion device 807 can also comprises a second memory device. The second memory device can be a programmable read only memory (PROM), erasable programmable read only memory (EPROM), electrically erasable programmable read only memory (EEPROM) or other memory device. The second memory can be programmed by receiving instructions from SCSI bus 808 or SCSI bus 809. The second memory device can be used to store boot up instructions for use by processor 812.

Memory 813 comprises converter module 810, emulation module 820, buffering module 830, and bus isolation module 840. Converter module 710 comprises a first plurality of processor executable instructions which is executable by processor 812 in the manner shown in FIG. 11. Converter module 810 performs functions similar to that of converter 510 described in FIG. 5. Emulation module 820 comprises a second plurality of processor executable instructions which is executed by processor 812 in the manner shown in FIG. 11. Emulation module 820 performs functions similar to that of emulator 520 described in FIG. 5. Buffering module 830 comprises a third plurality of processor executable instructions which is executable by processor 812 in the manner shown in FIG. 11. Buffering module 830 performs functions similar to that of buffering device 530 described in FIG. 5. Bus isolation module 840 comprises a fourth plurality of processor executable instructions which is executable by processor 812 in the manner shown in FIG. 11. Bus isolation module performs functions similar to that of bus isolation device 540 described in FIG. 5.

SCSI expansion device 807 can further comprise a serial bus. Processor 812 would be coupled to the serial bus. A first serial peripheral and a second serial peripheral can be coupled to the first serial bus and SCSI expansion device 807 can operate to provide the first serial peripheral data from the computer system at a constant throughput. Second serial device can be a storage device and first serial device can be a CD recording device. SCSI expansion device 807 could operate to allow a serial CD recorder to produce reliable recording from a network server or other computer systems.

SCSI expansion device 807 can further comprise a DMA controller. The DMA controller would be coupled to first SCSI bus 808 and second SCSI bus 809. The DMA controller would operate to coordinate DMA data transfers between the computer system coupled to second SCSI bus 809 and SCSI peripherals coupled to first SCSI bus 808.

DMA controller would comprise circuitry similar to that of DMA controller 216 illustrated in FIG. 2.

In a seventh embodiment of the present invention, the SCSI expansion device as described has a height of less than 1.75 inches, a width of less than 4.25 inches and a length of less than six inches. In doing so, SCSI expansion device 307 has a 3.5 inch form factor and mounting.

In a eighth embodiment of the present invention, the SCSI expansion device as described comprises two bus termination devices. One bus termination device is coupled to the first SCSI bus and the second bus termination device is coupled to the second SCSI bus. Each bus termination device upon selection by the user through a jumper, terminates the bus and absorbs the signal on the bus. In this manner, noise caused by echo of diminishing signals is reduced.

In an ninth embodiment of the present invention SCSI expansion device comprises a first SCSI bus, a second SCSI bus, and an emulator. The emulator is coupled to the first SCSI bus and the second SCSI bus. First SCSI bus is coupled to a first SCSI peripheral and a second SCSI peripheral. Second SCSI bus is coupled to an external computer system. The emulator can be implemented with a processor and a plurality of processor executable instructions stored in memory. Alternatively, the emulator can be an ASIC or other circuitry or device.

The emulator operates to emulate the second SCSI peripheral. When the first SCSI peripheral transmits a command over the first SCSI bus to the external computer system or other device coupled to the second SCSI bus, the emulator translates the command to a corresponding command of the second SCSI peripheral. Likewise, when the computer system responds with a command to the second SCSI peripheral, the emulator translates the command of the second SCSI peripheral to a corresponding command of the first SCSI peripheral. In this manner, the first SCSI peripheral appears as the second SCSI peripheral to the computer system coupled to the second SCSI bus. As an example, the first SCSI peripheral can be a hard disk drive and the second SCSI peripheral can be a tape device. Thus, the emulator emulates a tape device and the hard disk drive coupled to the first SCSI bus appears to a computer system coupled to the second SCSI bus as a tape device. The SCSI device emulated can also be a CD-ROM device, tape backup device, disk drive, hard disk drive, compact disk recorder or other SCSI device.

It will be appreciated that by emulating a second SCSI peripheral the emulator allows the first SCSI device to interface with a computer system coupled to the second SCSI bus even though software for the computer system may have been written for the second SCSI peripheral. This in turn, allows for enhanced versatility of existing software and reduces the need to rewrite software for a specific SCSI peripheral.

Under a tenth embodiment of the present invention, the SCSI expansion device further comprises an encryption encoder and a decryption decoder. The encryption encoder can be processor and a plurality of processor executable instructions stored in memory. Likewise, the decryption decoder can be processor and a plurality of processor executable instructions stored in memory. Both the encryption encoder and the decryption decoder are coupled to a first SCSI bus and a second SCSI bus.

The encryption encoder is operable to perform an encryption operation on data and commands transmitted on the first SCSI bus from the second SCSI bus. The decryption decoder is operable to perform a decryption operation on data and commands received from the first SCSI bus to be transmitted on the second SCSI bus. Alternatively, the encryption encoder is operable to perform an encryption operation on data and commands transmitted on the second SCSI bus from the first SCSI bus. The decryption decoder is operable to perform a decryption operation on data and commands received from the second SCSI bus to be transmitted on the first SCSI bus.

Figure 9:
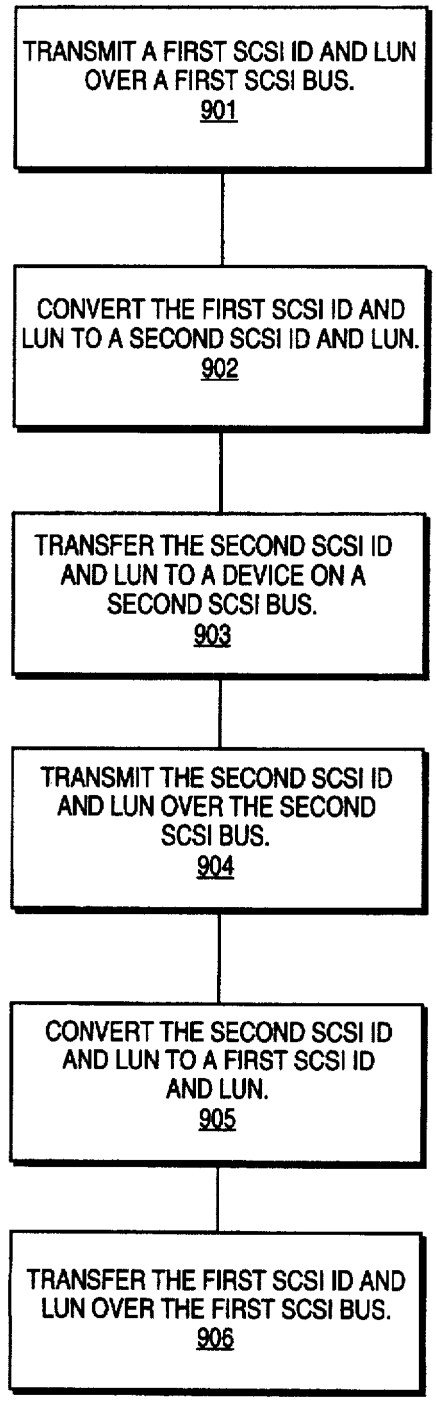
FIG. 9 is a flow chart illustrating a method for LUN mapping invention.

FIG. 9 illustrates in flowchart diagram form the operation of a SCSI expansion device of a eleventh embodiment of the present invention. First, a first peripheral on a first SCSI bus sends data and a first identification address comprising a first SCSI ID and LUN on the first SCSI bus as shown in block 501. The SCSI expansion device converts the first identification address to a second identification address comprising a second SCSI identifier and LUN. This is shown in block 502. The SCSI expansion device sends the data and the second identification address to an external device coupled to a second SCSI bus as shown in block 503. By doing this, the SCSI expansion device represents the first SCSI peripheral as having the second identification address.

When the external device coupled to the second SCSI bus wishes to transmit data to the first SCSI peripheral, it transmits the data and the second identification address along the second SCSI bus as shown in block 904. The SCSI expansion device converts the second address to the first address with the first SCSI ID and LUN as shown in block 905. The SCSI expansion device represents the delivery address (the second identification address) issued by the external device as the first identification address. The SCSI expansion device transfers the data and the first identification address to the first SCSI peripheral coupled to the first SCSI bus as shown in block 906.

Figure 10:
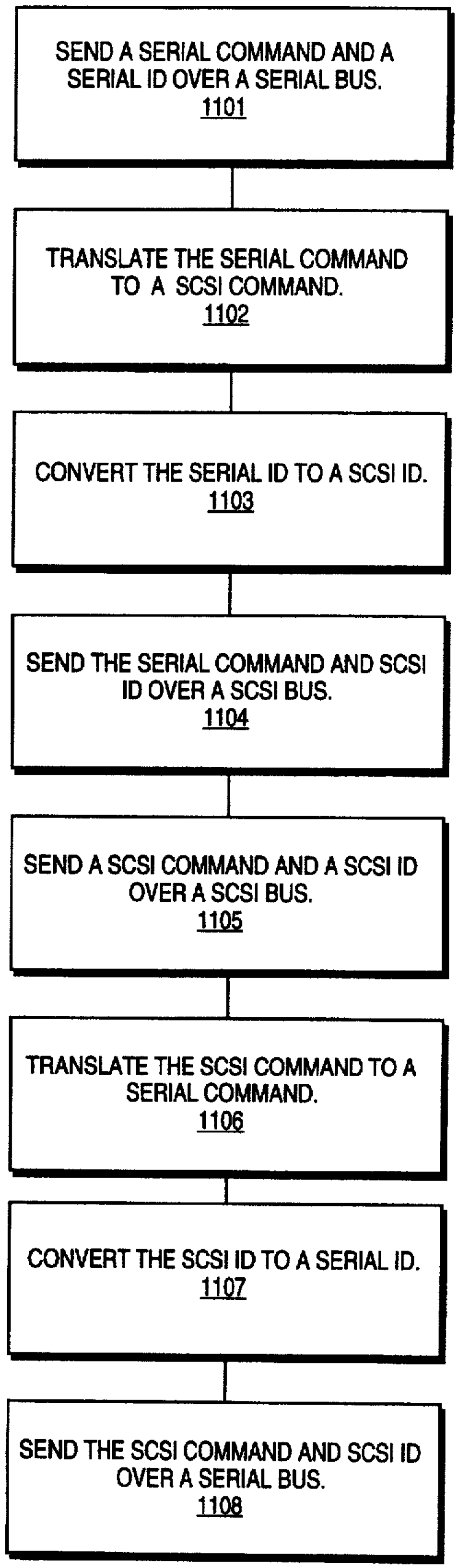
FIG. 10 is a flow chart illustrating a method for SCSI-serial translation.

FIG. 10 illustrates in flow diagram form the operation of a SCSI expansion device of a twelfth embodiment of the present invention. First, a first serial peripheral on a first serial bus transmits a first serial command and a first serial identifier on the first serial bus as shown in block 1001. The SCSI expansion device translates the first serial command to an equivalent first SCSI command as shown in block 1102. The SCSI expansion device also converts the first serial identifier to a first SCSI identification address comprising a first SCSI ID and LLUN. This is shown in block 1103. The SCSI expansion device transmits the first SCSI command and the first SCSI identification address to an external device coupled to the second SCSI bus as shown in block 1104. SCSI expansion device represents the first serial peripheral as a first SCSI peripheral to the external device by transmitting a SCSI command and a SCSI identification address to the external device.

When the external device coupled to the second SCSI bus wishes to transmit a command to the first serial peripheral, it transmits a second SCSI command and the first SCSI identification address along the second bus to the SCSI expansion device. This is shown in block 1005. SCSI expansion device translates the second SCSI command to an equivalent second serial command as shown in block 1006. The SCSI expansion device also converts the first SCSI identification address to the first serial identification address as shown in block 1007. SCSI expansion device transmits the second serial command and first serial identification address to the first serial peripheral. This is shown in block 1008. SCSI expansion device represents the exchange between the external device as a serial to serial exchange to the first serial device.

Figure 11:
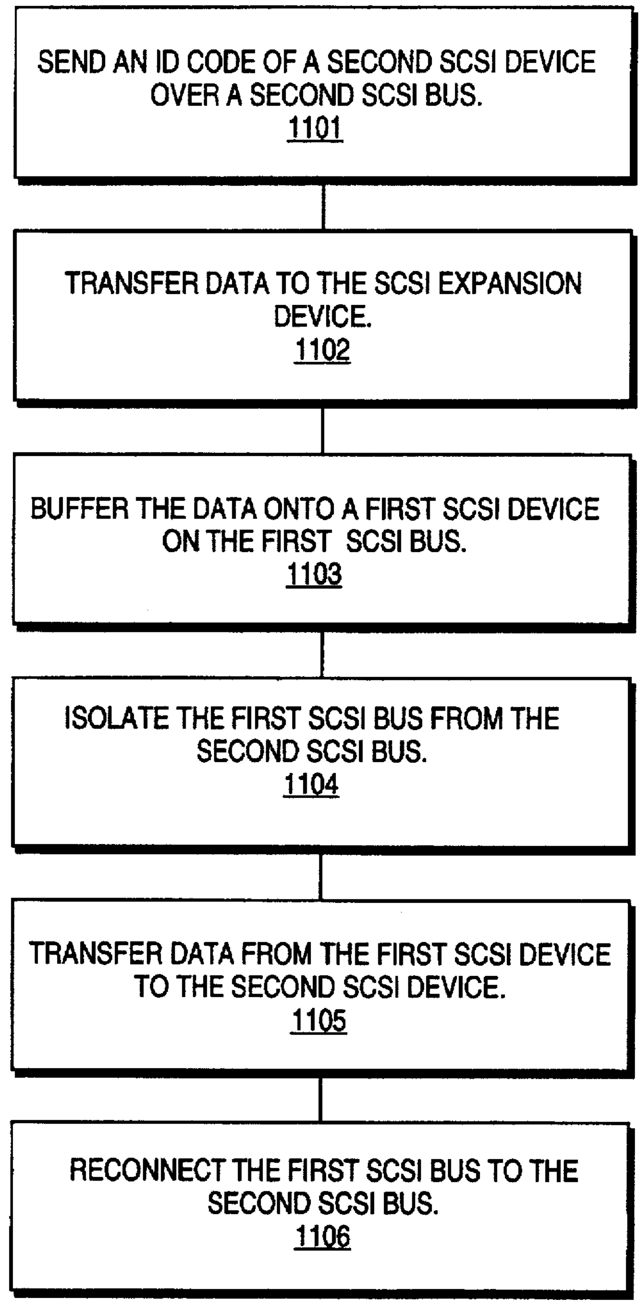
FIG. 11 is a flow chart illustrating a method for coordinating the transfer of data at a constant throughput rate.

FIG. 11 illustrates a flow diagram of a thirteenth embodiment of the present invention. SCSI expansion device emulates a first SCSI peripheral coupled to a first SCSI bus by sending the identification code of the first SCSI peripheral to an external device coupled to a second SCSI bus. This is shown in block 1101. External device then transfers data to the SCSI expansion device on the second SCSI bus as shown in block 1102. SCSI expansion device buffers the data received off of the second SCSI bus to a second SCSI peripheral on the first SCSI bus as shown in block 1103. After the external device is finished transferring data to the SCSI expansion device, SCSI expansion device isolates the first SCSI bus from the second SCSI bus. This is shown in block 1104. Next, the SCSI expansion device transfers the data received from the external device from the second SCSI peripheral to the first SCSI peripheral as shown in block 1105. After the data transfer is completed, SCSI expansion device reconnects first SCSI bus with second SCSI bus as shown in block 1106.

In the foregoing description, the invention is described with reference to specific exemplary embodiments thereof. It will, however, be evident that various modifications and changes may be made thereto without departing from the broader spirit and scope of the invention as set forth in the appended claims. The specifications and drawings are, accordingly, to be regarded in an illustrative rather than a restrictive sense.

Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims, which in themselves recite only those features regarded as essential to the invention.

Thus, an expansion apparatus has been described.

What is claimed is:

1. A method for transmitting data over a Small Computer System Interface (SCSI) network, comprising:

receiving a first address having a first SCSI identifier and a first logical unit number (LUN);

receiving a first SCSI command for a first device at the first address;

converting the first address to a second address having a second SCSI identifier and a second LUN;

translating the first SCSI command to a second SCSI command for a second device; and transmitting the second SCSI command to the second device at the second address.

2. The method of claim 1, further comprising:

receiving data for the first device at the first address; and transmitting the data to the second device at the second address.

3. The method of claim 2, wherein the step of receiving the data and transmitting the data is performed at a non-constant throughput rate.

4. The method of claim 2, further comprising:

transmitting the data from the second device at the second address to the first device at the first address.

5. The method of claim 4, wherein the step of transmitting the data from the second device at the second address to the first device at the first address is performed at a constant throughput rate.

6. A method for managing data inside a Small Computer System Interface (SCSI) expansion device, comprising:

receiving a first address having a first SCSI identifier and a first logical unit number (LUN) from a computer system;

receiving a first SCSI command for a first device at the first address from the computer system;

converting the first address to a second address having a second SCSI identifier and a second LUN;

translating the first SCSI command to a second SCSI command for a second device; and transmitting the second SCSI command to the second device at the second address.

7. The method of claim 6, further comprising:

receiving data for the first device at the first address from the computer system; and transmitting the data to the second device at the second address.

8. The method of claim 7, wherein the step of receiving the data and transmitting the data is performed at a non-constant throughput rate.

9. The method of claim 7, further comprising:

transmitting the data from the second device at the second address to the first device at the first address.

10. The method of claim 9, wherein the step of transmitting the data from the second device at the second address to the first device at the first address is performed at a constant throughput rate.

11. A Small Computer System Interface (SCSI) expansion device, comprising:

a first SCSI bus coupled to a first SCSI device and a second SCSI device;

a second SCSI bus coupled to a host adapter;

an emulator, coupled to the first SCSI bus and the second SCSI bus, that receives a first SCSI command from the host adapter addressed to the first SCSI device and that translates the first SCSI command to a second SCSI command understood by the second SCSI device; and a converter, coupled to the first SCSI bus and the second SCSI bus, that readdresses the second SCSI command to the second SCSI device.

12. The SCSI expansion device of claim 11, further comprising:

a bus isolation device, coupled to the first SCSI bus and the second SCSI bus, that isolates the first SCSI bus from the second SCSI bus.

13. The SCSI expansion device of claim 11, further comprising a buffering device, coupled to the first SCSI bus and the second SCSI bus, that coordinates movement of data from the host adapter to the second SCSI peripheral.

14. The SCSI expansion device of claim 11, further comprising a direct memory access (DMA) controller, coupled to the first SCSI bus and the second SCSI bus.

15. The SCSI expansion device of claim 11, further comprising a first serial bus, coupled to the emulator, that receives a first serial command translated from the first SCSI command from the emulator, wherein the first serial command is understood by a first serial device coupled to the first serial bus.

* * * * *